W. E. RICH.
Corn Planter.
No. 55,908.  Patented June 26, 1866.
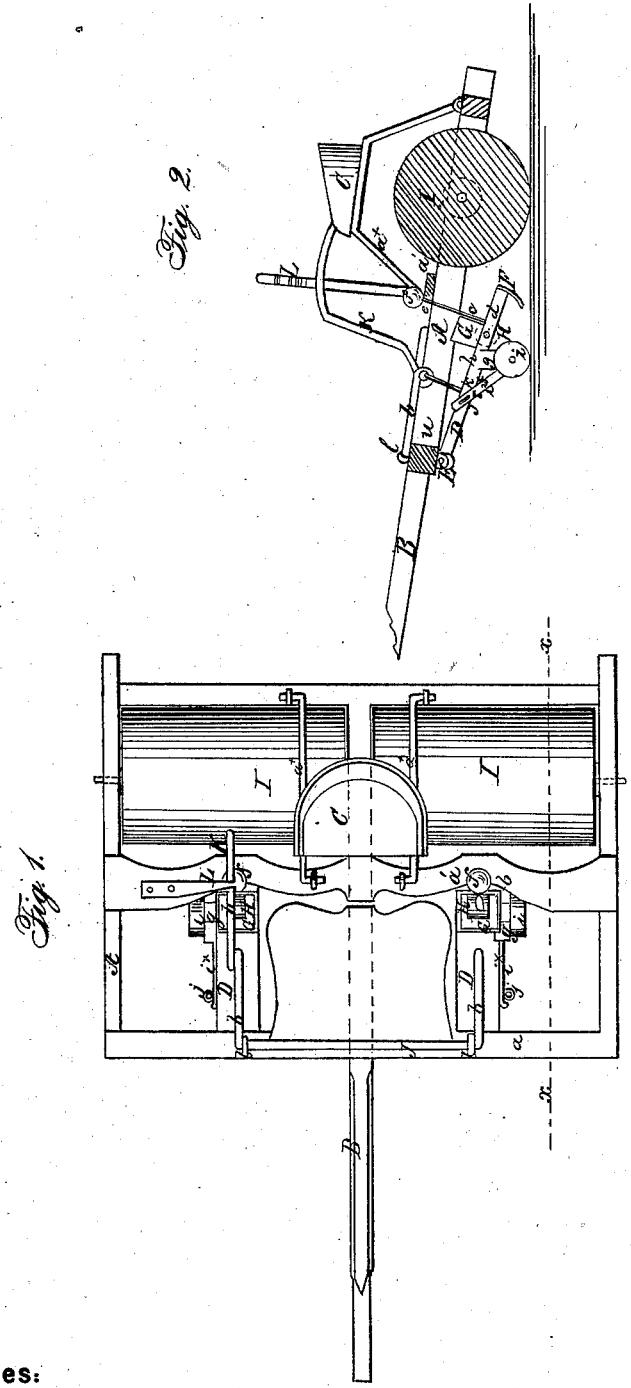
Witnesses:
Inventor:

UNITED STATES PATENT OFFICE.

W. E. RICH, OF NEW PROVIDENCE, IOWA.

IMPROVEMENT IN CORN-PLANTERS.

Specification forming part of Letters Patent No. 55,908, dated June 26, 1866.

*To all whom it may concern:*

Be it known that I, W. E. RICH, of New Providence, in the county of Hardin and State of Iowa, have invented a new and Improved Roller and Corn-Planter; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side sectional view of the same, taken in the line $x\ x$, Fig. 1.

Similar letters of reference indicate corresponding parts.

This invention relates to a new and improved machine for planting corn in check-rows and for covering the corn and rolling the earth upon the same.

The invention consists in a novel manner of operating the seed-distributing device and in the means for covering the seed, the above parts being used in connection with a roller, and all arranged as hereinafter set forth, whereby a field, after being properly furrowed in one direction, may be planted with corn in check-rows by the passage of the machine at right angles over furrows.

A represents a rectangular frame having a draft-pole, B, attached to it and supports $a^x$ $a^x$ secured to its upper surface, on which the driver's seat C is secured. D D are two bars, the front ends of which are attached by hinges E E to the front cross-piece, $a$, of the frame A. To the rear end of each bar D there is attached a hoe, F, and on each bar D, near its rear end, there is secured a seed-box, G. The bars D, near their rear ends, have slots made in them to receive wheels H, in the periphery of which a seed-cell, $b$, is made. These wheels H have each a rod, $c$, attached to them by a joint, $d$, and these rods pass loosely through guides $e$ on the front edge of the cross-piece $a'$, and have weights or balls $f$ on their upper ends, above the cross-piece $a'$.

Each bar D has an arm, $g$, secured to it by a pivot, $h$, and these arms have rollers $i$ at their lower ends. The arms $g$ are secured in position by bars $i^x$, connected to the bars D by pins $j$, a series of holes, $k$, being made in the bars D, through any of which the pins $j$ may be passed, according to the adjustment required for the bars D. (See Fig. 2.)

In the rear part of the frame A there are placed two rollers, I I, which are in line with each other. These rollers are underneath the driver's seat.

J is a shaft, the bearings $l$ of which are on the front cross-piece, $a$, of the machine. This shaft has an arm, $b$, projecting from each end of it at right angles, and one of these arms is prolonged to form a lever, K, which extends up within reach of the driver on seat C.

The operation is as follows: The seed-boxes G G are supplied with seed, and the field to be planted having been previously furrowed in one direction, the device is drawn over the furrows at right angles, and the rods $c$ are so adjusted that the weights or balls $f$ will rest upon the cross-piece $a'$, and the seed-cells $b$ in the wheels H be uppermost, so as to be filled with seed. As the rollers $i$ come to the furrows they pass or drop into them, and the bars D drop or fall, which causes the wheels H to rotate and the seed-cells $b$ to pass down and discharge their seed into the furrow, the wheels H returning back to their original position as the rollers pass out of the furrow. These bars D, it will be seen, work independently of each other, so that in case the furrows are not precisely straight the seed-dropping mechanism will not be affected thereby. The seed when dropped is covered by the hoes F, and the latter may be adjusted higher or lower to the rear ends of the bars D according to the depth it is required to cover the seed. The rollers I I compact the earth firmly down upon the seed and break the clods and lumps.

The bars D D, it will be seen, are allowed to rise in order to pass over obstructions without affecting the seed-dropping mechanism.

The rollers $i$ may be raised above the surface of the ground so as to render the seed-dropping mechanism inoperative whenever desired by actuating the lever K. The latter may be held by a suitable catch, L.

Having thus described my invention, what I claim as new, and desire to secure by Letters Patent, is—

1. The hinged bars D D, provided with the rollers $i$ and boxes G, in connection with the wheels H, having seed-cells $b$ made in them, and rods $c$, attached with weights $f$ at their upper ends, all arranged to operate in the manner substantially as and for the purpose specified.

2. The hoes F, attached to the rear ends of the bars D, in combination with the seed-dropping mechanism attached to said bars D, for the purpose set forth.

3. The rollers I I, in combination with the seed-dropping mechanism and covering-hoes, substantially as and for the purpose specified.

4. The attaching of the rollers $i$ to arms $g$, pivoted to the bars D, and retained in position by bars $i^\times$ and pins $j$, arranged substantially as shown and described, for the purpose of adjusting the bars D, as set forth.

WILLIAM E. RICH.

Witnesses:
   CYRUS A. LUNDY,
   LEVI J. LUNDY.